(12) United States Patent
Milich

(10) Patent No.: US 11,297,764 B1
(45) Date of Patent: Apr. 12, 2022

(54) SELF DRIVEN MOWER WITH LEFT AND RIGHT DRIVE TRAINS

(71) Applicant: Sam Milich, Nerang (AU)

(72) Inventor: Sam Milich, Nerang (AU)

( * ) Notice: Subject to any disclaimer, the term of this patent is extended or adjusted under 35 U.S.C. 154(b) by 0 days.

(21) Appl. No.: 17/314,263

(22) Filed: May 7, 2021

(30) Foreign Application Priority Data

Dec. 16, 2020 (AU) ................................ 2020904682

(51) Int. Cl.
*A01D 34/00* (2006.01)
*A01D 69/06* (2006.01)
*A01D 69/08* (2006.01)
*A01D 69/10* (2006.01)
*A01D 34/76* (2006.01)
*B60K 23/00* (2006.01)
(Continued)

(52) U.S. Cl.
CPC ........... *A01D 34/008* (2013.01); *A01D 34/76* (2013.01); *A01D 69/06* (2013.01); *A01D 69/08* (2013.01); *A01D 69/10* (2013.01); *B60K 1/00* (2013.01); *B60K 17/00* (2013.01); *B60K 23/00* (2013.01); *A01D 2101/00* (2013.01); *B60K 2700/00* (2013.01)

(58) Field of Classification Search
CPC .. A01D 34/008; A01D 34/68; A01D 34/6806; A01D 34/6812; A01D 34/69; A01D 2034/6825–6843; A01D 69/06; A01D 69/08; A01D 2101/00; B60K 17/00; B60K 17/02; B60K 17/04; B60K 17/06; B60K 17/08; B60K 17/34; B60K 17/342; B60K 17/344; B60K 23/00; B60K 23/02; B60K 23/08; B60K 23/0808; B60K 2023/085; B60K 2023/0883; B60K 2023/0891; B60K 2700/00; B60K 2700/02; B62D 11/08
See application file for complete search history.

(56) References Cited

U.S. PATENT DOCUMENTS 4,020,619 A * 5/1977 Massaro ................ A01D 34/69
56/11.2
4,964,265 A 10/1990 Young
(Continued)

FOREIGN PATENT DOCUMENTS

EP 1745686 A1 * 1/2007 ........... A01D 34/008
EP 3791708 3/2021
WO WO-2015064780 A1 * 5/2015 ........... A01D 34/008

*Primary Examiner* — Adam J Behrens
(74) *Attorney, Agent, or Firm* — Bonini IP Law, LLC; Frank J. Bonini, Jr.

(57) ABSTRACT

A drive on an all wheel drive mower/slasher having on each side an assembly comprises appropriate brackets and fittings, axles, chains and tensioners where the worm gear output carries a forward direction spur gear and then extends to clutch. The clutch has an output gear and a forward chain travelling over a chain gear on reversible shaft, the reversible shaft is journaled in bearings. Chain gears and deliver drive to the wheel chain gears via respective chains. The spur gear is in mesh with a same sized gear so that when clutch 31 is disengaged and clutch engaged the wheels on one side are set forward. The brake clutches are disengaged. Chain and belt tensioners are provided in the usual way. The pulley has fan blades set above the pulley and the pulley has fan blades set below. Brakes are engaged on the turn side for skid steering.

20 Claims, 9 Drawing Sheets

(51) Int. Cl.
*B60K 1/00* (2006.01)
*B60K 17/00* (2006.01)
*A01D 101/00* (2006.01)

(56) References Cited

U.S. PATENT DOCUMENTS

| | | | |
|---|---|---|---|
| 5,204,814 | A | 4/1993 | Noonan et al. |
| 6,112,843 | A * | 9/2000 | Wilcox ................. B60K 17/36 180/209 |
| 6,363,630 | B1 * | 4/2002 | Ziegler ................. B60K 17/02 180/19.3 |
| 7,024,842 | B2 | 4/2006 | Hunt et al. |
| 7,418,328 | B2 | 8/2008 | Romig |
| 11,186,172 | B1 * | 11/2021 | Kumar .................. B60K 17/02 |
| 2003/0182919 | A1 * | 10/2003 | Baumann ............... A01D 34/71 56/320.1 |
| 2015/0165898 | A1 * | 6/2015 | Bindl ..................... F16H 48/10 180/248 |
| 2017/0367258 | A1 * | 12/2017 | Shaffer ............... A01D 34/6812 |
| 2019/0136949 | A1 * | 5/2019 | Khayatian ............... F16H 61/30 |
| 2020/0120865 | A1 * | 4/2020 | Di Biase ................ A01D 34/44 |

\* cited by examiner

|  | Brake Clutches 35 and 36 | Clutch 31 | Clutch 32 | Clutch 33 | Clutch 34 |
|---|---|---|---|---|---|
| Forward | N | N | N | Y | Y |
| Reverse | N | Y | Y | N | N |
| Clockwise | N | Y | N | N | Y |
| Anticlockwise | N | N | Y | Y | N |
| Idle | Y | N | N | N | N |

FIG.5B

SELF DRIVEN MOWER WITH LEFT AND RIGHT DRIVE TRAINS

TECHNICAL FIELD

This invention relates to self propelled vehicles as may be used in an agricultural type environment and also to a drive train suitable for use with these kinds of vehicles, as in for example self propelled wheeled cutting machines, such as mowers, slashers and brush cutters and in particular but not limited to cutting machines of the deck mounted rotary blade mower/slasher type.

BACKGROUND

Self driven and remote controlled vehicles are well known. They have been used on the moon and now Mars. In recent times much has been made of self driven and robot type mowers but, generally speaking, these are not especially robust, are complex, and as such are not suited to harsh environments and rugged conditions as characterised by typical rural cutting and slashing tasks.

Applicant has on and off worked in this field over the years, an original prototype mower by the present inventor being described in Australian Patent Application 199060903. However, this mower utilised in part, separate electric motor drives, and drive control was in conjunction with mechanical limit switches to control direction of a worm drive. This created irregular drive and torque issues due to motor switching and hunting. The present invention takes a completely different tack using a purely mechanical drive system suited to electronic control, this provides high torque and more importantly simplicity, giving reduced maintenance, longevity and overall is more reliable and more robust and much easier to control.

Examples of some recent patents involving various arrangements for self driven mowing with automated or semi-automated drives are described below. These demonstrate that the trend is towards complexity.

U.S. Pat. No. 4,964,265 describes a radio controlled mower, similar to the Applicant's earlier mower, in that it also employs electric motors. This necessitates relative complexities in control electronics. EP 3791708 describes a complex electric drive having a wheel drive and a wheel orientation drive where the wheels are effectively multi-directional castors, this arrangement is said to increase efficiency. Similar wheels and drives are employed in U.S. Pat. No. 7,418,328 which employs two electric motors for each wheel. U.S. Pat. No. 7,024,842 has two electric motors per wheel. Other approaches to directional control are to have a stored path or to have the mower track the previous selvage line or some underground wire. An example is in U.S. Pat. No. 5,204,814 which has its primary navigation from a stored path and secondary navigation via and underground wire. This mower uses two electric motors.

A problem with these known devices is complexity both in the mechanical arrangement and the control electronics.

It is an object of the present invention to provide a robust vehicle, relatively simple drive and control arrangement that is durable, long lasting, practically maintenance free, and suitable to operation in rugged conditions.

SUMMARY OF THE INVENTION

In one aspect there is provided a remote controlled or autonomously operated self driven vehicle, the vehicle having four wheels and left and right side drive trains between an onboard motive source and the wheels, the drive trains delivering all wheel drive to the four wheels, the four wheels comprising two right side wheels and two left side wheels, the drive trains having respective sets of shafts, gears and couplings connecting the shafts, each drive train having an input and respective wheel outputs, each drive train having respective associated electromagnetic clutches and a clutch controller, the clutches being selectively engaged by operation of the clutch controller for forward, reverse and turning movement of the vehicle. The control of the wheels is preferably such as to provide a turning movement comprising an on the spot turn with sets of wheels on opposite sides spinning in opposite directions. The vehicle has a front and a rear and is arranged with a low centre of gravity. Typically, there is a higher rear and a low front.

Preferably, the vehicle further includes a selectable brake to arrest motion of the wheels, the inputs to the drive trains each comprising an output from a worm drive reduction gear box, each input being connected to a first gear being rotatable in a first direction and a second gear being rotatable in the opposite direction to the first gear, the associated clutches being associated with the first and second gears to selectively connect drive from the first and second gears to the wheels. It is typical that the first gear is a reverse gear and the second gear is a forward gear.

In one form the associated clutches comprise pairs of right side and left side clutches, the drive trains having an input comprising an input shaft, wheel outputs comprising respective wheel shafts and an intermediate shaft between the input shaft and the wheel shafts, the intermediate shaft being reversible in response to control of the associated clutches to reverse rotation of the wheels. Where the vehicle is used for mowing or slashing, typically there is a cutting blade(s) shaft drive take off upstream of the inputs to the drive trains.

In the case where there is a selectable brake to arrest motion of the wheels, the associated clutches comprise four clutches, the vehicle motion and clutch control is in accordance with the following truth table:

|  | brake engaged | first clutch | second clutch | third clutch | fourth clutch |
|---|---|---|---|---|---|
| Forward | N | N | N | Y | Y |
| Reverse | N | Y | Y | N | N |
| Clockwise | N | Y | N | N | Y |
| Anticlockwise | N | N | Y | Y | N |
| Idle | Y | N | N | N | N |

Typically, the clutches comprise a forward direction right side clutch, a forward direction left side clutch, a reverse direction right side clutch, a reverse direction left side clutch, there being respective forward clutch engageable axles and rearward positioned reversible axles, the reversible axles being coupled to wheel shafts on opposite sides via coupling chains. The reversible axle is usually an intermediate shaft positioned between respective wheel axles. Typically, this shaft rotates in concert with the wheel axles via chains and sprockets.

Typically, the selectable brake to arrest motion of the wheels is provided by a right side brake clutch and a left side brake clutch.

In a preferred form there is provided a remote controlled or autonomously operated self driven vehicle including a selectable brake to arrest motion of the wheels, the inputs to the drive trains each comprising an output from a worm drive reduction gear box, each input being connected to a first gear being rotatable in a first direction and a second gear being rotatable in the opposite direction to the first gear, the associated clutches being associated with the first and second gears to selectively connect drive from the first and second gears to the wheels, the drive trains having an input comprising an input shaft, wheel outputs comprising respective wheel shafts and an intermediate shaft between the input shaft and the wheel shafts, the intermediate shaft being reversible in response to control of the associated clutches to reverse rotation of the wheels.

In another preferred form there is provided a remote controlled or autonomously operated self driven vehicle including a selectable brake to arrest motion of the wheels, the inputs to the drive trains each comprising an output from a worm drive reduction gear box, each input being connected to a first gear being rotatable in a first direction and a second gear being rotatable in the opposite direction to the first gear, the associated clutches being associated with the first and second gears to selectively connect drive from the first and second gears to the wheels, the drive trains having an input comprising an input shaft, wheel outputs comprising respective wheel shafts and an intermediate shaft between the input shaft and the wheel shafts, the intermediate shaft being reversible in response to control of the associated clutches to reverse rotation of the wheels, the intermediate shaft being coupled to the input and the wheel outputs by chains and sprockets.

In each embodiment it is preferred that the controller comprises a remote control receiver and a switching network downstream of the receiver, the switching network being responsive to realtime remote control from a user via the receiver or a pre-recorded timed sequence.

In a cost effective embodiment the clutches have a clutch housing and comprise a modified clutch housing having gears or sprockets, the modification comprising preparing the housing and the gears or sprockets being welded or otherwise secured to the prepared housing.

In a vehicle employing a worm drive and the wheels having respective axes of rotation about respective wheel shafts, each drive train comprises an input being an output from the worm drive, the outputs from the worm drive rotating about a worm drive rotation axis in a worm drive direction of rotation, the input having a spur gear rotatable in the same direction as the worm drive and in concert with it, a second gear in mesh with the spur gear and rotating in the opposition direction to the spur gear, the worm drive, spur gear and second gear being normally disconnected from the wheels but spinning when the vehicle is stationary, the associated clutches comprising a spur gear associated clutch axially aligned with the spur gear along an axially extending spur gear shaft and a second gear associated clutch axially aligned with the second gear, an intermediate shaft between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling between the shafts, the intermediate shaft being coupled to the wheel shafts for transmitting drive from the gears via the clutches and via the intermediate shaft to the wheels.

In a still further preferred form there is provided a remote controlled or autonomously operated self driven vehicle, having a worm drive and the wheels having respective axes of rotation about respective wheel shafts, each drive train comprises an input being an output from the worm drive, the outputs from the worm drive rotating about a worm drive rotation axis in a worm drive direction of rotation, the input having a spur gear rotatable in the same direction as the worm drive and in concert with it, a second gear in mesh with the spur gear and rotating in the opposition direction to the spur gear, the worm drive, spur gear and second gear being normally disconnected from the wheels but spinning when the vehicle is stationary, the associated clutches comprising a spur gear associated clutch axially aligned with the spur gear along an axially extending spur gear shaft and a second gear associated clutch axially aligned with the second gear, an intermediate shaft between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling between the shafts, the intermediate shaft being coupled to the wheel shafts for transmitting drive from the gears via the clutches and via the intermediate shaft to the wheels, each clutch having a clutch housing and comprises a modified clutch housing having gears or sprockets, the modification comprising preparing the housing and the gears or sprockets being welded or otherwise secured to the prepared housing.

While any suitable motive source may be used, in a typical use as a cutting machine, it is preferred that the motive source comprises an internal combustion engine having a drive take off, there being a cutting blade assembly having an input taking its drive directly or indirectly from the drive take off, and there being a worm drive having an input also taking its drive directly or indirectly from the drive take off.

In an especially preferred form there is provided a remote controlled or autonomously operated self driven vehicle wherein the controller comprises a remote control receiver and a switching network downstream of the receiver, the switching network being responsive to realtime remote control from a user via the receiver or a pre-recorded timed sequence, the vehicle having a worm drive and the wheels having respective axes of rotation about respective wheel shafts, each drive train comprises an input being an output from the worm drive, the outputs from the worm drive rotating about a worm drive rotation axis in a worm drive direction of rotation, the input having a spur gear rotatable in the same direction as the worm drive and in concert with it, a second gear in mesh with the spur gear and rotating in the opposition direction to the spur gear, the worm drive, spur gear and second gear being normally disconnected from the wheels but spinning when the vehicle is stationary, the associated clutches comprising a spur gear associated clutch axially aligned with the spur gear along an axially extending spur gear shaft and a second gear associated clutch axially aligned with the second gear, an intermediate shaft between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling between the shafts, the intermediate shaft being coupled to the wheel shafts for transmitting drive from the gears via the clutches and via the intermediate shaft to the wheels.

There are many applications of the present invention, one application being a remote controlled or autonomously operated vehicle having a cutting blade assembly, the vehicle and assembly being adapted for a mowing or slashing operation. During remote control, the user operates a continuously variable forward/reverse, and left/right joystick or equivalent on a control pad, and even though the clutches have on/off operation, the control electronics is configured such that the operation in terms of look and feel of operation is effectively continuous.

BRIEF DESCRIPTION OF THE DRAWINGS

In order that the present invention may be more readily understood and put into practical effect reference will now be made to the accompanying drawings which illustrate preferred embodiments of the invention and wherein:—

FIG. 5B is a truth table for each clutches in accordance FIG. 5A and the vehicle motion;

METHOD OF PERFORMANCE

Figure 1:
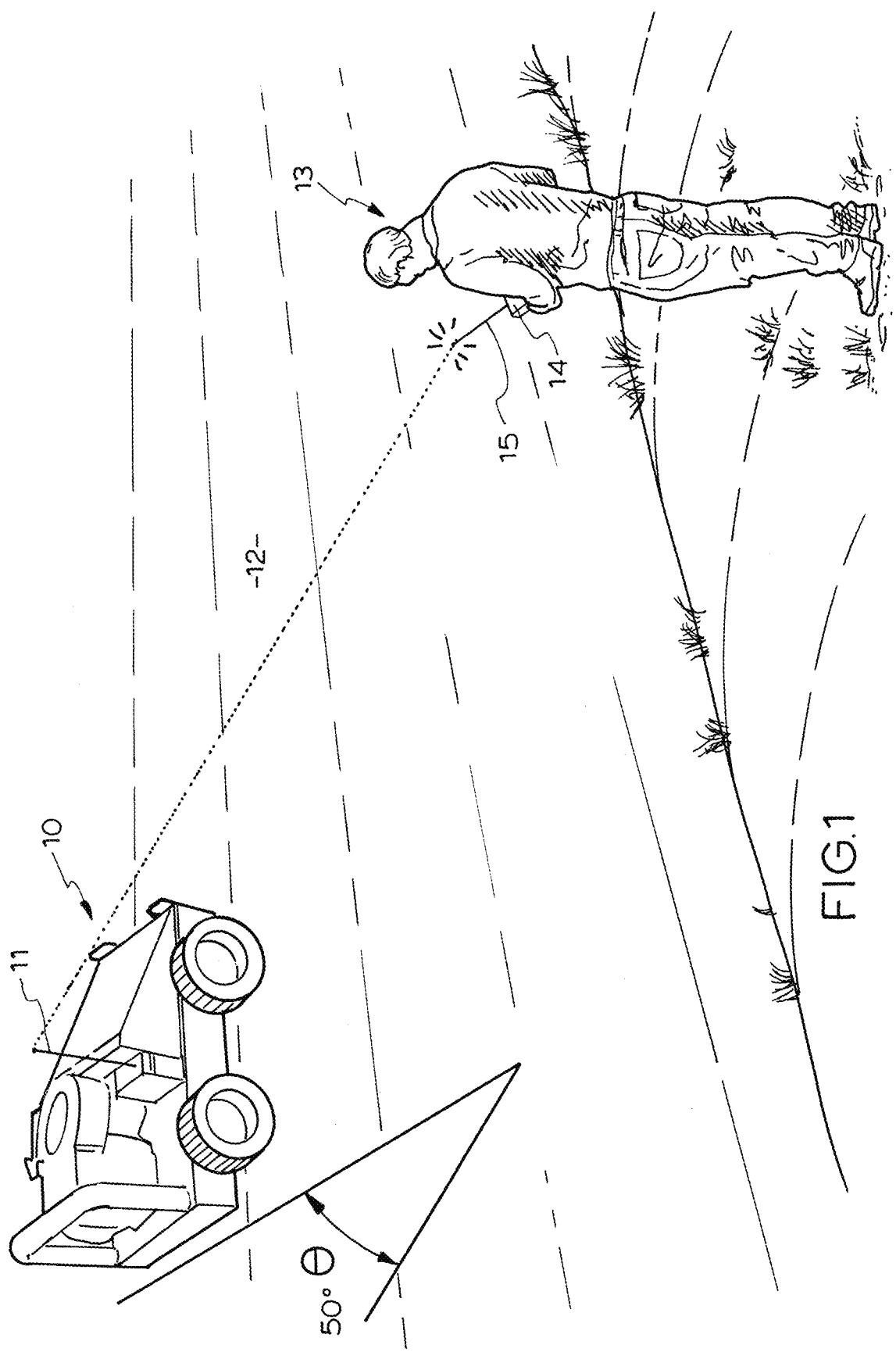
FIG. 1 is an overview of the use of a radio controlled cutting machine according to the present example.
Figure 2:
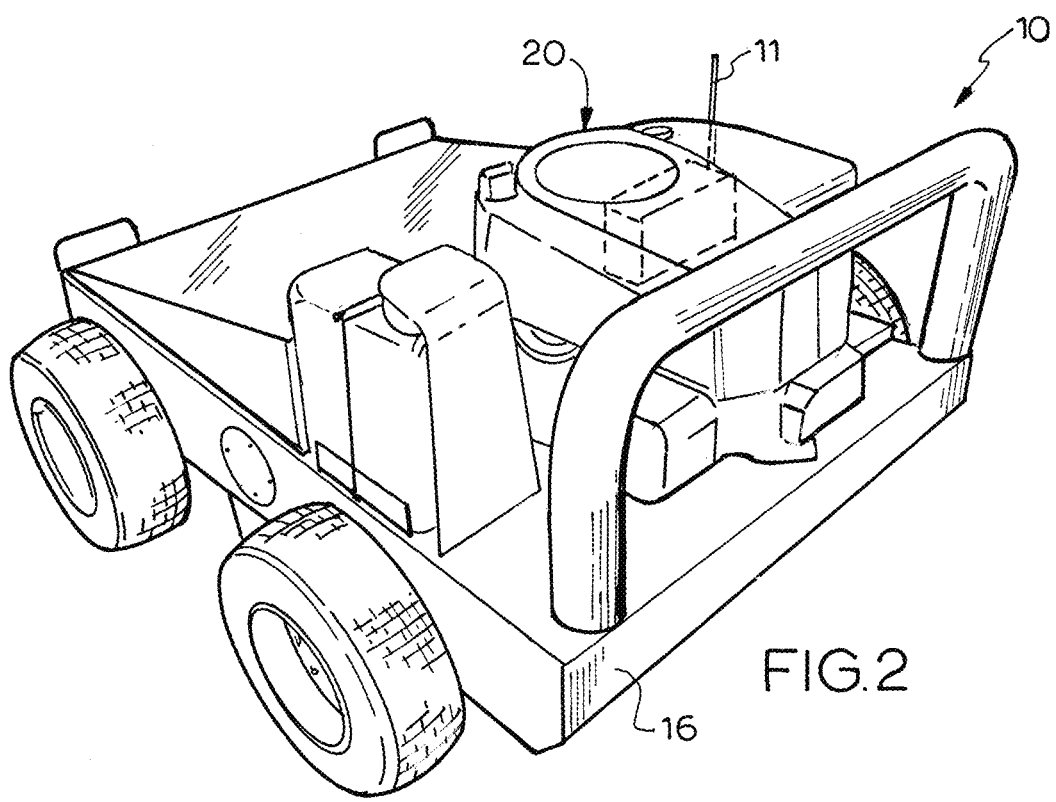
FIGS. 2 and 3 are rear and front views.
Figure 3:
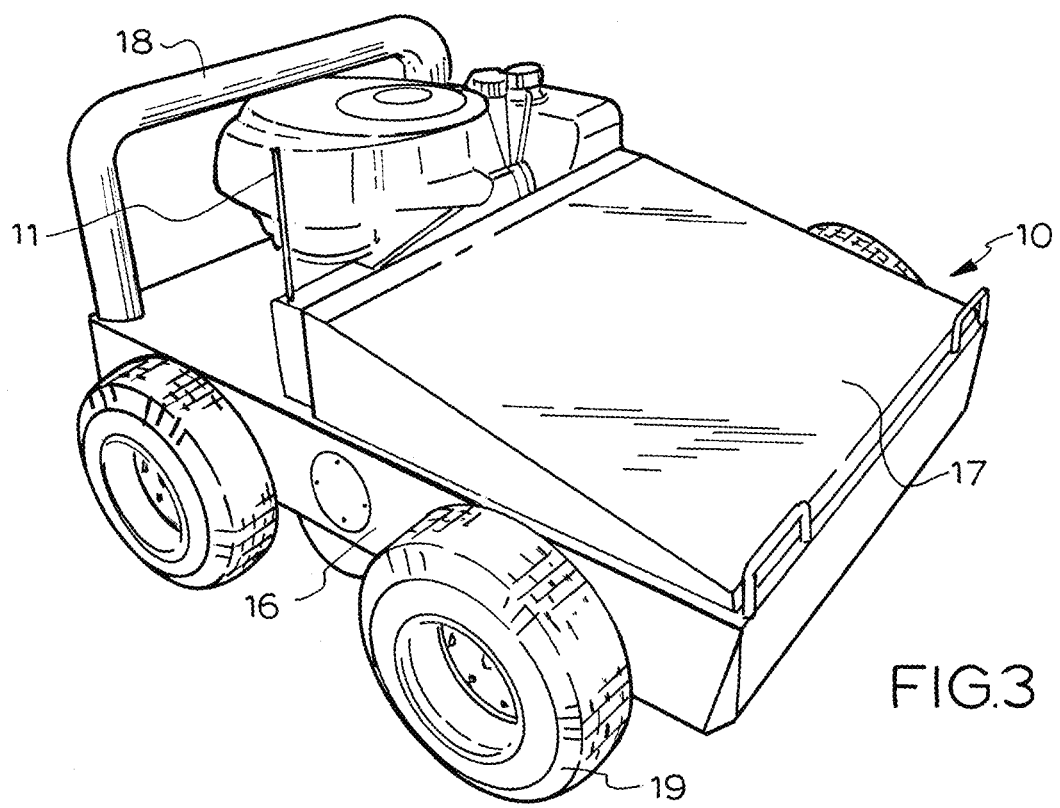
Figure 4:
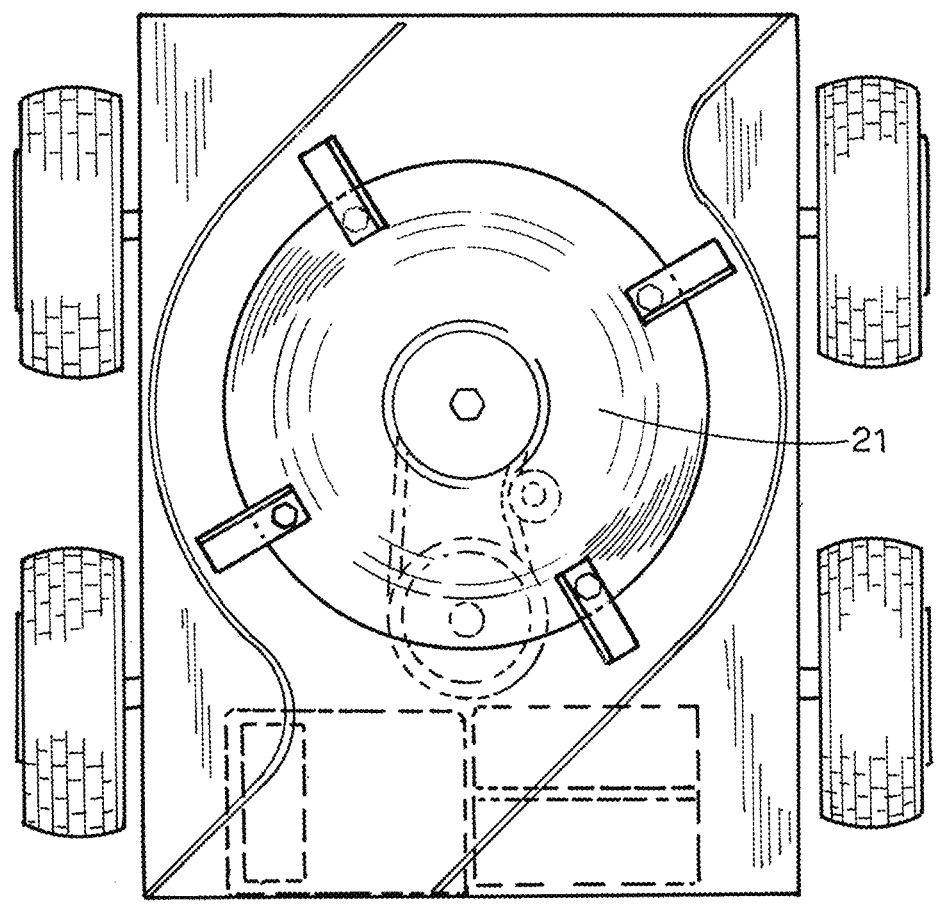
FIG. 4 is an underside view.

Referring to the drawings and initially to FIGS. 1 to 4 there is illustrated a low profile, low centre of gravity, wheeled cutting machine 10 having a receiver antennae 11, and in this example, in FIG. 1, is operating on a 50° slope 12. An operator 13 controls the machine 10 via a handheld radio controlled command panel 14 having a transmit antenna 15.

The machine 10 in this example is a mower/slasher and is of robust construction having a body 16, removable cover 17, rear handle 18 and all terrain type wheels 19. The wheels in this case are about 13 inches by 5 inches by 6 inches with a suitable tread. The machine in this case is all wheel drive and weighs about 120 kg. It has a low profile giving a low center of gravity so it may be used on relatively steep slopes as shown. A motive source, in this case an IC 16 hp petrol engine 20, is the sole drive for a 32 inches diameter cutting blade disc 21 via its takeoff and then through drive trains onto forward, reverse and skid steer operation of the wheels 19 via a worm drive reduction gearbox. Other gear reduction setups may be used for input to the drive trains. The worm drive example and drive trains will be described in greater detail below in reference to the drive train.

It will be appreciated that while the blade disc position, may be made height adjustable, the principal application of the embodiment is cutting and slashing rather than collection of clippings, so in these situations where large areas are to be cut in rural or semi rural environs, the height adjustment is not of any great advantage, in fact it can add to maintenance costs. If, of course, height adjustment is desirable then this will be easily fitted according to ordinary practice by raising or lowering the wheel shafts since, in this example, flexible drive chains are employed.

Figure 5A:
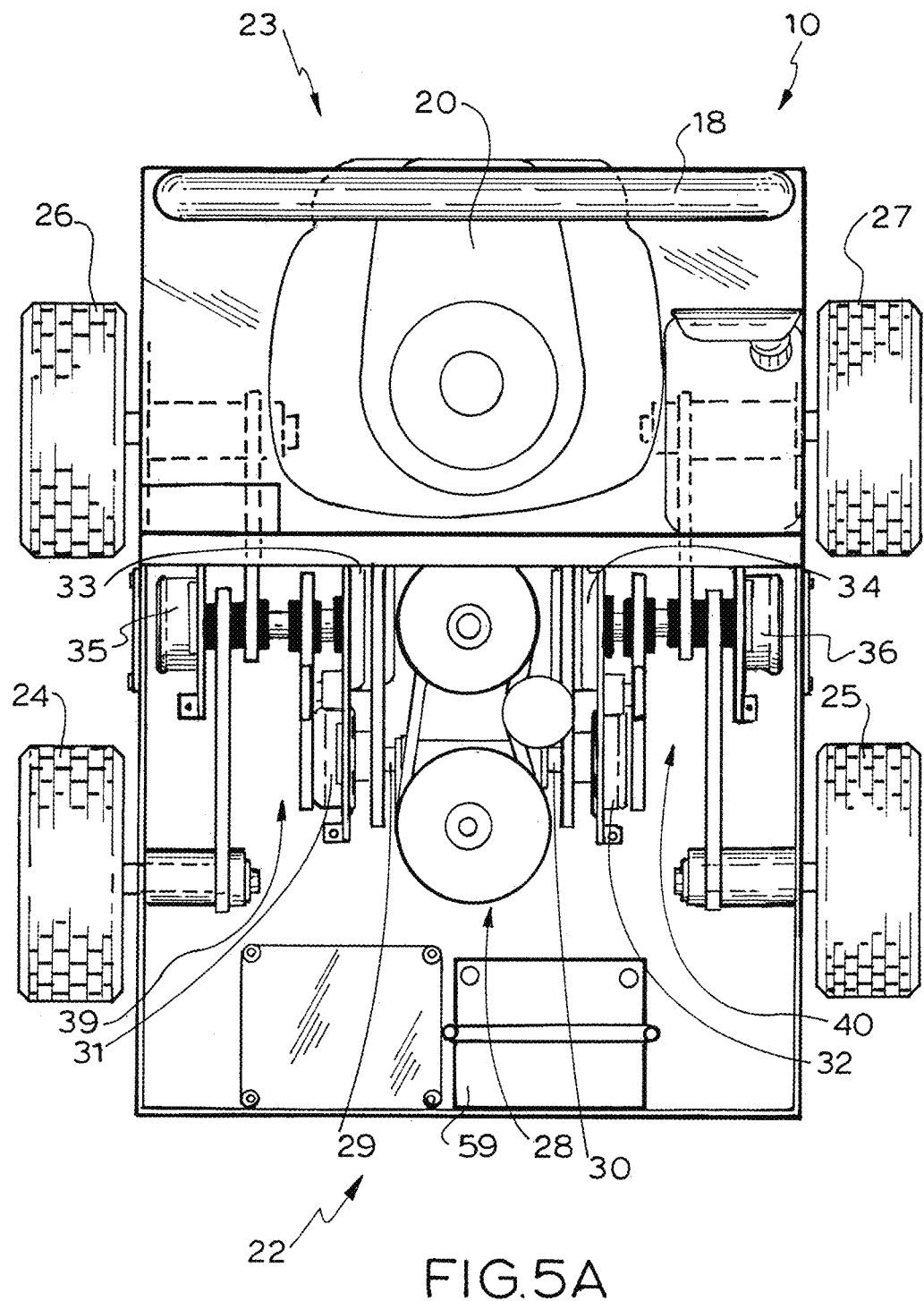
FIG. 5A is a drawing showing the drive with the cover off.

FIG. 5A illustrates the control of the drive to the wheels using six electromagnetic clutches. In forward and reverse and turning operations, all wheels are driven. This enables a very tight 360 degree on the spot turn when opposite sets of wheels are driven simultaneously in opposite directions. In this example the clutches are modified York compressor clutches commonly used in 12V air conditioning units. This is a very cost effective option using easily modified existing technology.

The vehicle has a relatively low front 22 and higher back 23. There is a right front wheel 24, a left front wheel 25, a right rear wheel 26 and a left rear wheel 27. The drive to the wheels is taken off the internal combustion engine 20 via belt and pulleys 28 (via a cutting disc pulley) and each output 29, 30 of a dual output worm gear reduction gearbox such that the overall reduction is to about 90 rpm at the wheels.

Figure 6A:
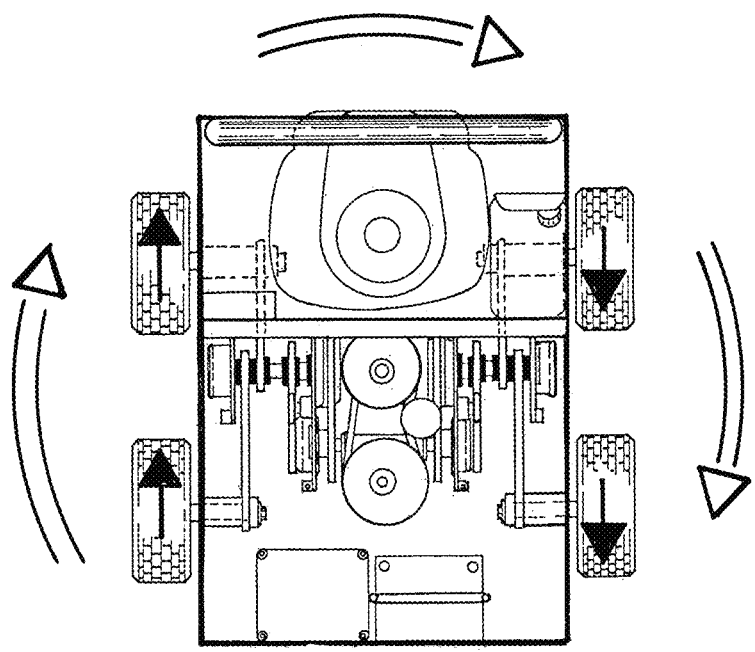
FIGS. 6A and 6B show the on the spot turning with wheel directions.
Figure 6B:
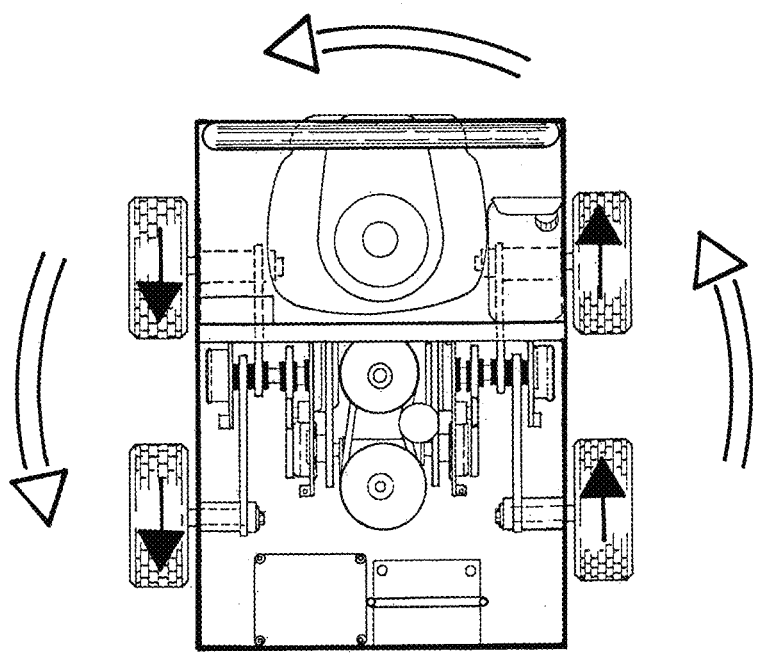

Six magnetic clutches, three on each side are employed. Only four of these concern the drive to the wheels. There is a reverse direction right side clutch 31, a reverse direction left side clutch 32, a forward direction right side clutch 33, a forward direction left side clutch 34, the selectable brakes in this case are provided by a right side brake clutch 35 and a left side brake clutch 36. As may be seen from the truth table of FIG. 5B the operation of the clutches provides for forward, reverse, an effective angular on the spot turning action where the sets of wheels on each side spin in opposite directions. (see FIGS. 6A (clockwise) and 6B (anticlockwise)) There is a safety position with the forward and reverse clutches disengaged and both brake clutches applied to all wheels via each wheel axle and the associated drive chains.

Generally speaking, any arrangement to deliver timed codes according to the truth table may control the vehicle regardless of whether it is an onboard program sequence or whether it is by remote control or any other signal delivery method.

Figure 8:
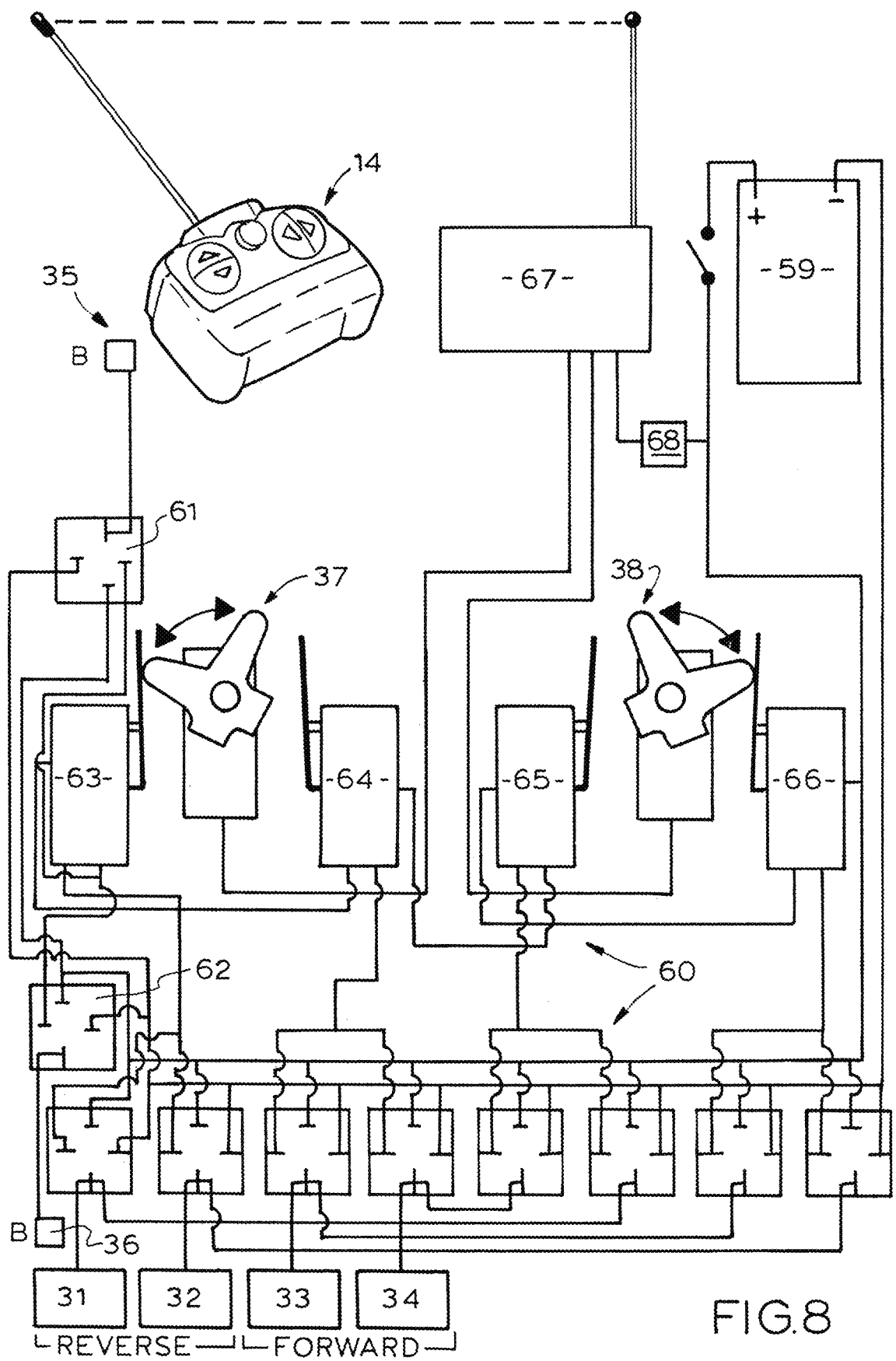
FIG. 8 is a typical onboard switching and relay arrangement for radio control of clutch relays in accordance with FIG. 1.

It should therefore be appreciated that the example herein of a radio control is non limiting. Other self driven and/or remote control may include any known navigation including GPS, mobile phone app, learning and recording and replay modes. There may be storage and playback from a handheld remote. In this sense the vehicle may be first in a teaching or learning mode and then the time sequence in accordance with the truth table of FIG. 5B may be replayed to repeat the navigation sequence between the recorded starting position and recorded destination. In the case of the radio control example as shown in FIG. 8 a form of switching network with forward/reverse servo and switch assembly 37 and a left/right turn servo and switch assembly 38 are employed with ten relays in order for the switching network to achieve the truth table variations of FIG. 5B. The switching may be provided by mechanical switches as in the following example of FIG. 8 or by logic or solid state switching or by a microcontroller based circuit programmed to match output to the truth table requirements. This operation and more detail of the drivetrain will be described in further detail below.

Figure 7:
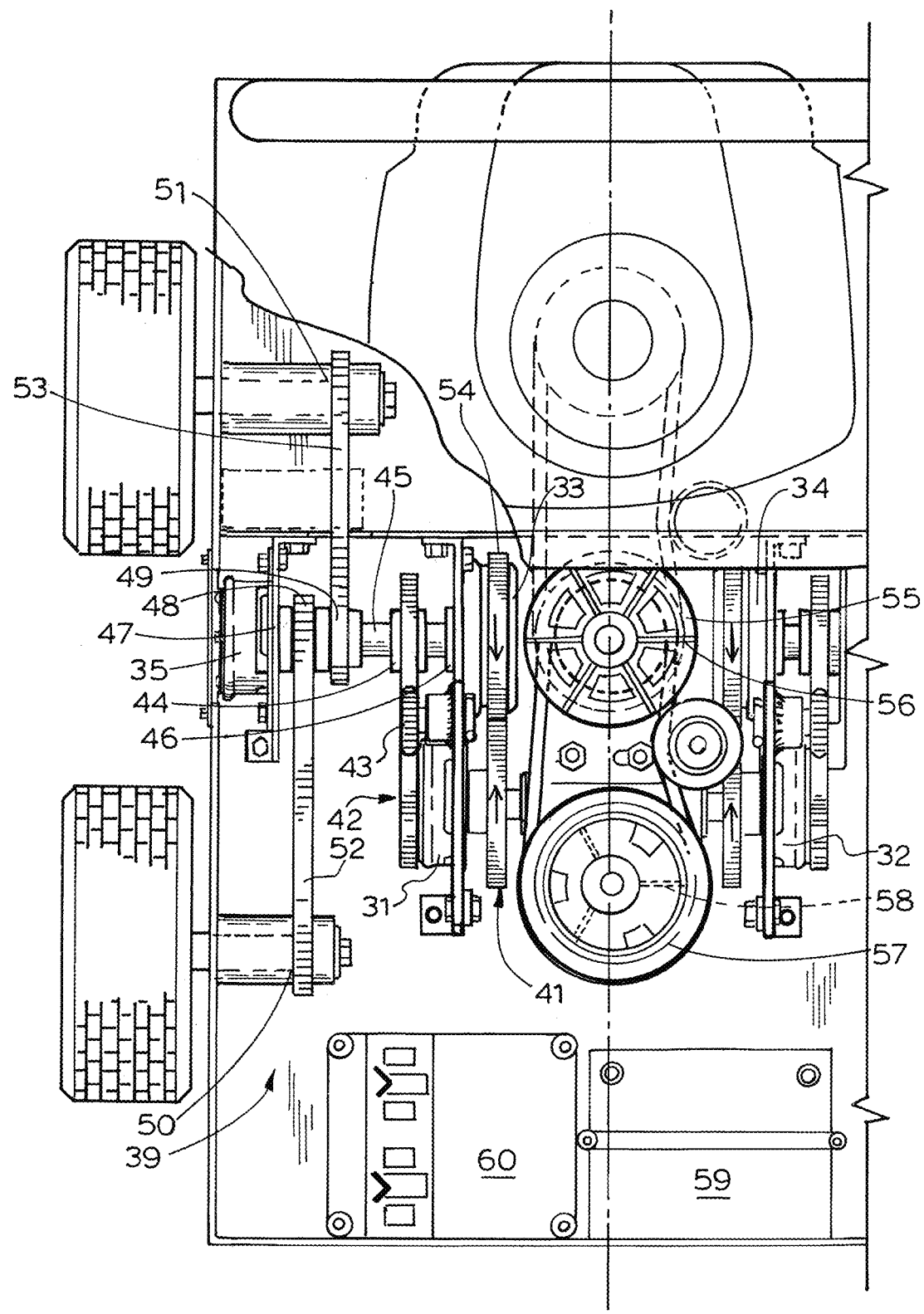
FIG. 7 is a more detailed and enlarged view of the right side wheels and drive train (left side shown in part)

Referring to FIG. 7 there is an enlarged cut away view showing more detail. Based on FIG. 5A the right and left hand drive trains are substantially the same employing the same arrangement of shafts, bearings, clutches, gears and chains in both right side assembly 39 and left side assembly 40.

The following description will be of the right side assembly 39 it being appreciated that this is mirrored on the left side. The assembly 39 comprises appropriate brackets and fittings, chains and belt/chain tensioners where the worm gear output 29 carries a first gear being a reverse direction spur gear 41 (directional arrow shown on top of gear) and then extends to clutch 31. The clutch 31 has an output chain sprocket 42 and a reverse direction chain 43 travelling over a chain sprocket 44 on intermediate reversible shaft 45, the reversible shaft 45 is journaled in bearings 46 and 47. Chain sprockets 48 and 49 deliver drive to the wheel chain sprockets 50 and 51 via chains 52 and 53 respectively. Other drive trains may be devised that achieve the same outcome.

The spur gear 41 moves in concert with the worm drive and is in mesh with a second gear being same sized gear 54 so that when clutch 31 is disengaged and clutch 33 engaged the wheels are all set in forward direction rotation. The brake clutches have been disengaged. Chain and belt tensioners are provided in the usual way. The pulley 55 has fan blades 56 set above the pulley and the pulley 57 has fan blades 58 set below. In this arrangement the gears 41 and 54 are at all times always rotating in concert with the worm gear. Each clutch 31 and 33 has been modified with the sprocket 42 and gear 54 welded to the clutch housing. In the case of the York clutch what was a pulley wheel is machined to take a matching internally machined gear or sprocket. (See FIG. 9.)

Other features in FIG. 7 include a 12V battery 59 and a switch box 60. The wiring has been omitted from these drawings for clarity but is set out in the FIG. 8 schematic.

In the example given in FIG. 8 the servos 37 and 38 are shown as activating circuit breakers for control of the clutches. Servo 37 is for forwards and backwards motion while servo 38 is for left and right. There is a relay bank 60 of ten relays all of which are normally open at power up except for the brake relays 61 and 62 which are closed. Thus at turn on and neutral all the shafts are disengaged and the brakes are engaged. Four circuit breakers 63, 64, 65 and 66 have a single pole inlet and a double throw output and the servos are controlled via the receiver 67. The receiver 67 has its 6V power supply at 68 and which in turn all controls are taken and controlled by the operator using the radio control panel at 14. The circuit breakers, relays and servos as controlled by the radio control panel are configured in the drawing of FIG. 8 to achieve the truth table of FIG. 5B. There is no need to describe the specific connection and switching in detail as this particular arrangement of mechanical switches is optional, the skilled person will readily appreciate the operation. In terms of overall effect the following operation is achieved and matched to the sensitivity of the remote control and servos. The brakes are instantaneously engaged and disengaged in response to the operation of the circuit breakers. However, it will be appreciated that when the left or right turn control is operating while the forward or reverse is also operated, only one set of wheels will be overridden by the control to right or left and the other set will simply continue to spin so that there is an on the spot turn to any desired angle up to 360 degrees so it effectively feels like continuous control notwithstanding the intervention of switch and relays set at thresholds by reason of the arms on the servos and the switch and relay characteristics.

Figure 9:
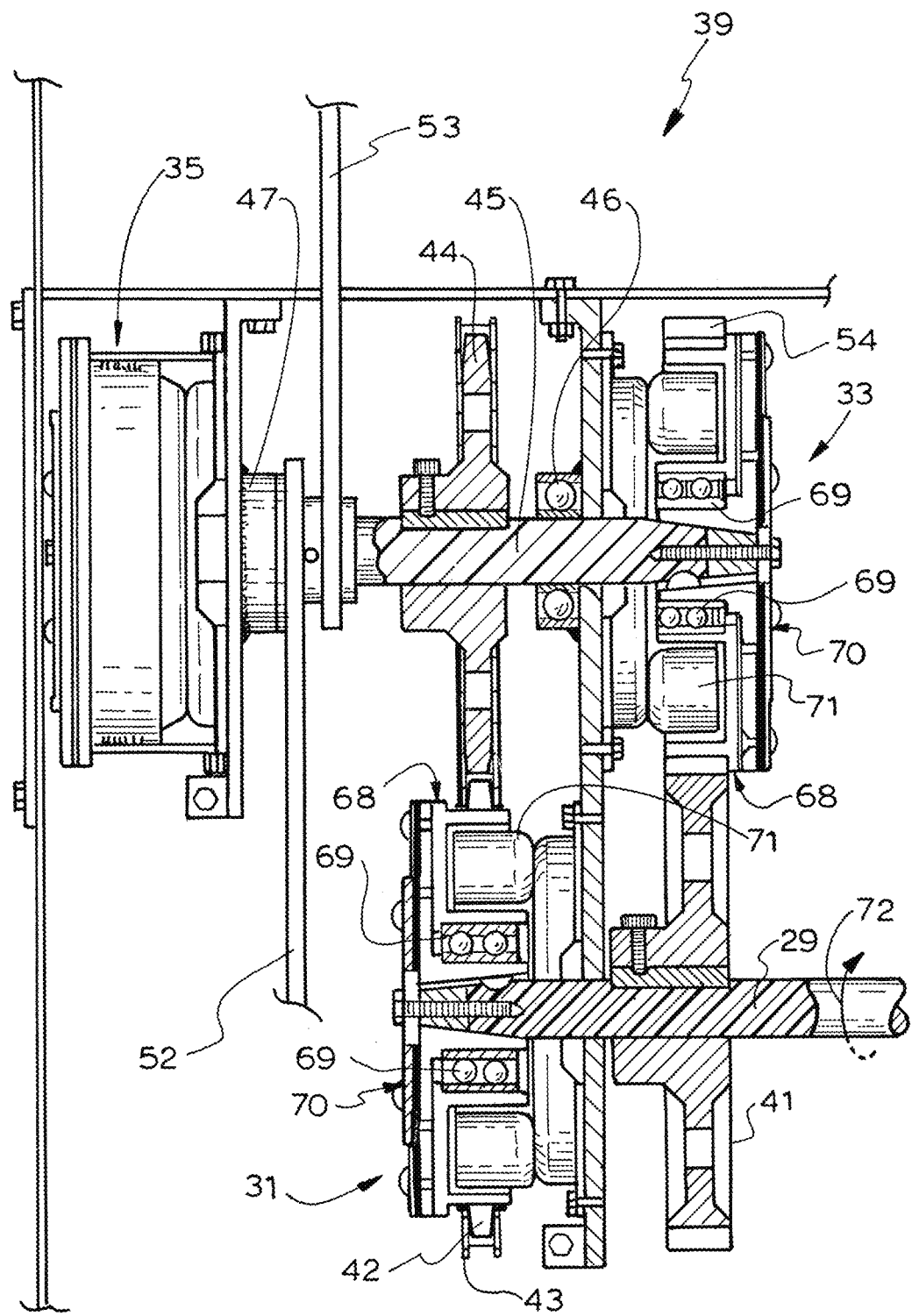
FIG. 9 is a part cut away view of the left side drive train.

Referring to FIG. 9 there is a part section with the chain 43 omitted. Like numerals illustrate like features. The clutches employed are identical 12V electromagnetic clutches so like numbers illustrate like features. The clutch housing 68 rotates on clutch bearings 69 and has a clutch plate assembly 70 used to engage and disengage the clutch in each case. The activation coil or solenoid is shown at 71. The housing 68 has been machined for gear or sprocket. The gear 54 is welded to its corresponding housing. The sprocket 42 is welded to its corresponding housing. The clutch plate 69 of clutch and sprocket assembly 31 is secured to shaft 29. Shaft 29 rotates in the direction of arrow 72. A removable access panel is provided on each side to enable the brake clutches 35 and 36 to be serviced.

Whilst the above has been given by way of illustrative example many variations and modifications will be apparent to those skilled in the art without departing from the broad ambit and scope of the invention as herein set out in the appended claims.

What is claimed is:

1. A remote controlled or autonomously operated self-driven mower, the mower comprising:
    a body with an onboard motive source,
    a mower deck,
    a cutting blade assembly within the deck powered by the onboard motive source,
    four wheels comprising two right side wheels operatively connected to a right side drive train and two left side wheels operatively connected to a left side drive train,
    each of the left and right side drive trains positioned between the onboard motive source and their respective wheels,
    the drive trains powered by the onboard motive source and delivering all-wheel drive to the four wheels, each drive train having respective sets of shafts, gears, and couplings connecting the shafts; each drive train having an input and respective wheel outputs; each drive train having a respective set of electromagnetic clutches; the clutches being selectively engaged by operation of a clutch controller for forward, reverse and turning movement of the mower.

2. The remote controlled or autonomously operated self-driven mower according to claim 1, further including selectable brakes to arrest motion of the wheels;
    the inputs to the drive trains each comprising an output from a worm drive reduction gear box, each input being connected to a first gear of the set of gears, the first gear being rotatable in a first direction, and a second gear of the set of gears, the second gear being rotatable in an opposite direction to the first gear;
    the set of clutches being associated with the first and second gears to selectively connect drive from the first and second gears to the wheels.

3. The remote controlled or autonomously operated self-driven mower according to claim 1, wherein the respective sets of electromagnetic clutches comprise pairs of right side and left side electromagnetic clutches.

4. The remote controlled or autonomously operated self-driven mower according to claim 1, wherein the respective sets of electromagnetic clutches comprise pairs of right side and left side electromagnetic clutches;
    each drive train's set of shafts comprising:
    an input shaft,
    wheel outputs comprising respective wheel shafts,
    and an intermediate shaft between the input shaft and the wheel shafts, the intermediate shaft being reversible in response to control of the set of electromagnetic clutches to reverse rotation of the wheels.

5. The remote controlled or autonomously operated self-driven mower according to claim 1, comprising a cutting blade(s) shaft drive take off upstream of the inputs to the drive trains.

6. The remote controlled or autonomously operated self-driven mower according to claim 2, wherein the first gear is a reverse gear and the second gear is a forward gear.

7. The remote controlled or autonomously operated self-driven mower according to claim 1, further including selectable brakes to arrest motion of the wheels;
    the respective sets of electromagnetic clutches comprise four clutches, wherein motion and clutch control is in accordance with the following truth table:

|  | brake engaged | first clutch | second clutch | third clutch | fourth clutch |
|---|---|---|---|---|---|
| Forward | N | N | N | Y | Y |
| Reverse | N | Y | Y | N | N |
| Clockwise | N | Y | N | N | Y |
| Anticlockwise | N | N | Y | Y | N |
| Idle | Y | N | N | N | N. |

8. The remote controlled or autonomously operated self-driven mower according to claim 1, wherein the electromagnetic clutches comprise:
a forward direction right side electromagnetic clutch,
a forward direction left side electromagnetic clutch,
a reverse direction right side electromagnetic clutch,
and a reverse direction left side electromagnetic clutch;
each set of shafts comprising respective forward clutch engageable axles and rearward positioned reversible axles, the reversible axles being coupled to wheel shafts on opposite sides via coupling chains.

9. The remote controlled or autonomously operated self-driven mower according to claim 1, further including selectable brakes to arrest motion of the wheels provided by a right side brake clutch and a left side brake clutch.

10. The remote controlled or autonomously operated self-driven mower according to claim 1, wherein the turning movement comprises an on the spot turn with the two right side wheels and two left side wheels on opposite sides spinning in opposite directions.

11. The remote controlled or autonomously operated self-driven mower according to claim 1, being adapted for a mowing or slashing operation.

12. The remote controlled or autonomously operated self-driven mower according to claim 1, further including selectable brakes to arrest motion of the wheels;
the inputs to the drive trains each comprising an output from a worm drive reduction gear box, each input being connected to a first gear of the set of gears, the first gear being rotatable in a first direction and a second gear of the set of gears, the second being rotatable in an opposite direction to the first gear;
the set of clutches being associated with the first and second gears to selectively connect drive from the first and second gears to the wheels;
each drive train's set of shafts comprising:
an input shaft,
wheel outputs comprising respective wheel shafts,
and an intermediate shaft between the input shaft and the wheel shafts, the intermediate shaft being reversible in response to control of the set of electromagnetic clutches to reverse rotation of the wheels.

13. The remote controlled or autonomously operated self-driven mower according to claim 1, further including selectable brakes to arrest motion of the wheels;
the inputs to the drive trains each comprising an output from a worm drive reduction gear box, each input being connected to a first gear of the set of gears, the first gear being rotatable in a first direction and a second gear of the set of gears, the second gear being rotatable in an opposite direction to the first gear;
the set of clutches being associated with the first and second gears to selectively connect drive from the first and second gears to the wheels;
each drive train's set of shafts comprising:
an input shaft,
wheel outputs comprising respective wheel shafts,
and an intermediate shaft between the input shaft and the wheel shafts, the intermediate shaft being reversible in response to control of the set of electromagnetic clutches to reverse rotation of the wheels, the intermediate shaft being coupled to the input and the wheel outputs by chains and sprockets.

14. The remote controlled or autonomously operated self-driven mower according to claim 1, wherein the controller comprises: a remote control receiver and a switching network downstream of the receiver, the switching network being responsive to real-time remote control from a user via the receiver or a pre-recorded timed sequence.

15. The remote controlled or autonomously operated self-driven mower according to claim 1, wherein the electromagnetic clutches have a clutch housing that comprises a modified clutch housing having gears or sprockets, modification comprising preparing the housing and the gears or sprockets for being welded or otherwise secured to the prepared housing.

16. The remote controlled or autonomously operated self-driven mower according to claim 1, having a worm drive and the wheels having respective axes of rotation about respective wheel shafts of the set of shafts;
each drive train's input being an output from the worm drive, the outputs from the worm drive rotating about a worm drive rotation axis in a worm drive direction of rotation, each input having:
a spur gear of the set of gears rotatable in the same direction as the worm drive and in concert with it,
a second gear of the set of gears in mesh with the spur gear and rotating in an opposition direction to the spur gear;
the worm drive, spur gear, and second gear being normally disconnected from the wheels but spinning when the mower is stationary;
each set of electromagnetic clutches comprising: a spur gear associated clutch axially aligned with the spur gear along an axially extending spur gear shaft and a second gear associated clutch axially aligned with the second gear;
an intermediate shaft of the set of shafts between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling of the set of couplings between the shafts, the intermediate shaft being coupled to the wheel shafts for transmitting drive from the gears via the set of electromagnetic clutches and via the intermediate shaft to the wheels.

17. The remote controlled or autonomously operated self-driven mower according to claim 1, having a worm drive and the wheels having respective axes of rotation about respective wheel shafts of the set of shafts;
each drive train's input being an output from the worm drive, the outputs from the worm drive rotating about a worm drive rotation axis in a worm drive direction of rotation, each input having:
a spur gear of the set of gears rotatable in the same direction as the worm drive and in concert with it,
a second gear of the set of gears in mesh with the spur gear and rotating in an opposition direction to the spur gear;
the worm drive, spur gear, and second gear being normally disconnected from the wheels but spinning when the mower is stationary;

each set of electromagnetic clutches comprising: a spur gear associated clutch axially aligned with the spur gear along an axially extending spur gear shaft and a second gear associated clutch axially aligned with the second gear;

an intermediate shaft of the set of shafts between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling of the set of couplings between the shafts, the intermediate shaft being coupled to the wheel shafts for transmitting drive from the gears via the set of electromagnetic clutches and via the intermediate shaft to the wheels;

each electromagnetic clutch having a clutch housing that comprises a modified clutch housing having gears or sprockets, modification comprising preparing the housing and the gears or sprockets for being welded or otherwise secured to the prepared housing.

18. The remote controlled or autonomously operated self-driven mower according to claim 1, having a worm drive and the wheels having respective axes of rotation about respective wheel shafts of the set of shafts;

each drive train's input being an output from the worm drive, the outputs from the worm drive rotating about a worm drive rotation axis in a worm drive direction of rotation, each input having:

a spur gear of the set of gears rotatable in the same direction as the worm drive and in concert with it, a second gear of the set of gears in mesh with the spur gear and rotating in an opposition direction to the spur gear;

the worm drive, spur gear, and second gear being normally disconnected from the wheels but spinning when the mower is stationary;

each set of electromagnetic clutches comprising: a spur gear associated clutch axially aligned with the spur gear along an axially extending spur gear shaft and a second gear associated clutch axially aligned with the second gear;

an intermediate shaft of the set of shafts between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling of the set of couplings between the shafts, the intermediate shaft being coupled to the wheel shafts for transmitting drive from the gears via the set of electromagnetic clutches and via the intermediate shaft to the wheels;

the motive source comprising an internal combustion engine having a drive take off, the cutting blade assembly having an input taking its drive directly or indirectly from the drive take off, the worm drive having an input also taking its drive directly or indirectly from the drive take off.

19. The remote controlled or autonomously operated self-driven mower according to claim 1, having a worm drive and the wheels having respective axes of rotation about respective wheel shafts of the set of shafts;

each drive train's input being an output from the worm drive, the outputs from the worm drive rotating about a worm drive rotation axis in a worm drive direction of rotation, each input having:

a spur gear of the set of gears rotatable in the same direction as the worm drive and in concert with it, a second gear of the set of gears in mesh with the spur gear and rotating in an opposition direction to the spur gear;

the worm drive, spur gear, and second gear being normally disconnected from the wheels but spinning when the mower is stationary;

each set of electromagnetic clutches comprising: a spur gear associated clutch axially aligned with the spur gear along an axially extending spur gear shaft and a second gear associated clutch axially aligned with the second gear;

an intermediate shaft of the set of shafts between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling of the set of couplings between the shafts, the intermediate shaft being coupled to the wheel shafts for transmitting drive from the gears via the set of electromagnetic clutches and via the intermediate shaft to the wheels;

the motive source comprising an internal combustion engine having a drive take off, the cutting blade assembly having an input taking its drive directly or indirectly from the drive take off, the worm drive having an input also taking its drive directly or indirectly from the drive take off, the mower having a front and a rear and being arranged with a low centre of gravity.

20. The remote controlled or autonomously operated self-driven mower according to claim 1, wherein the controller comprises a remote control receiver and a switching network downstream of the receiver, the switching network being responsive to real-time remote control from a user via the receiver or a pre-recorded timed sequence;

the mower having a worm drive and the wheels having respective axes of rotation about respective wheel shafts of the set of shafts;

each drive train's input being an output from the worm drive, the outputs from the worm drive rotating about a worm drive rotation axis in a worm drive direction of rotation, each input having:

a spur gear of the set of gears rotatable in the same direction as the worm drive and in concert with it, a second gear of the set of gears in mesh with the spur gear and rotating in an opposition direction to the spur gear;

the worm drive, spur gear, and second gear being normally disconnected from the wheels but spinning when the mower is stationary;

each set of electromagnetic clutches comprising: a spur gear associated clutch axially aligned with the spur gear along an axially extending spur gear shaft and a second gear associated clutch axially aligned with the second gear;

an intermediate shaft of the set of shafts between the wheel shafts, the second gear being journaled in bearings to rotate independently about the intermediate shaft, the second gear associated clutch being operable to connect the second gear to the intermediate shaft, the spur gear associated clutch being operable to connect the spur gear to the intermediate shaft via a coupling of the set of couplings between the shafts, the intermediate shaft being coupled to the wheel shafts for transmitting drive from the gears via the set of electromagnetic clutches and via the intermediate shaft to the wheels.

* * * * *